United States Patent [19]

Capper

[11] Patent Number: 5,694,632
[45] Date of Patent: Dec. 2, 1997

[54] CAMERA WITH AUTOFOCUS AND AIMING MECHANISM AND METHOD

[75] Inventor: David G. Capper, Sausalito, Calif.

[73] Assignee: Capper Technologies, Inc., Novato, Calif.

[21] Appl. No.: 263,067

[22] Filed: Jun. 22, 1994

Related U.S. Application Data

[63] Continuation-in-part of Ser. No. 813,373, Dec. 23, 1991, abandoned, and a continuation-in-part of Ser. No. 313,148, Aug. 12, 1994, Pat. No. 5,596,368, and a continuation-in-part of Ser. No. 835,192, Feb. 12, 1992, Pat. No. 5,189,463.

[51] Int. Cl.⁶ .................................................... G03B 13/00
[52] U.S. Cl. .................................................... 396/431
[58] Field of Search ............................ 354/162, 165, 354/166, 219, 221, 403; 352/131, 170, 171; 396/89, 106, 129, 147, 148, 429, 431

[56] References Cited

U.S. PATENT DOCUMENTS

| Re. 29,599 | 3/1978 | Ogawa. | |
|---|---|---|---|
| 2,282,045 | 5/1942 | Fleischer | 354/221 |
| 2,642,790 | 6/1953 | Scholkemeier | 354/165 |
| 2,701,500 | 2/1955 | Schwartz et al. | 354/166 |
| 2,816,475 | 12/1957 | Waller et al. | 396/431 |
| 3,008,398 | 11/1961 | Sanborn | 354/165 |
| 3,754,249 | 8/1973 | Kearney, II | 343/6 R |
| 3,860,935 | 1/1975 | Stauffer | 354/407 |
| 3,875,401 | 4/1975 | Stauffer | 354/407 |
| 4,002,899 | 1/1977 | Stauffer | 354/405 |
| 4,386,848 | 6/1983 | Clendenin et al. | 356/5 |
| 4,572,625 | 2/1986 | Arndt et al. | 359/402 |
| 4,672,436 | 6/1987 | Hawthorne | 354/219 |
| 4,689,016 | 8/1987 | Eichweber | 434/22 |
| 4,818,865 | 4/1989 | Matsui et al. | 354/403 |
| 4,884,137 | 11/1989 | Hanson et al. | 358/108 |
| 4,914,460 | 4/1990 | Caimi et al. | 354/162 |
| 4,963,017 | 10/1990 | Schneiter et al. | 356/1 |
| 4,969,006 | 11/1990 | Ishibashi et al. | 354/402 |
| 5,005,213 | 4/1991 | Hanson et al. | 358/93 |
| 5,038,162 | 8/1991 | Tejima | 354/221 |
| 5,054,917 | 10/1991 | Pepin et al. | 356/152 |
| 5,059,019 | 10/1991 | McCullough | 352/131 |
| 5,543,889 | 8/1996 | McIntyre | 396/431 |

*Primary Examiner*—David M. Gray
*Attorney, Agent, or Firm*—Kolisch, Hartwell, Dickinson, McCormack & Heuser

[57] ABSTRACT

A camera (10) having a light source (20) that produces a beam of light (22) extending in the direction the camera (10) is aimed. A light pattern produced by reflection of the beam of light (22) by an object informs the user where the camera (10) is aimed. Actuation of a shutter trigger (16) deactivates the light source (20) and then actuates a shutter mechanism in the camera (10), with the camera (10) at this time being properly aimed. The shutter trigger (16) may also actuate an autofocus system (230).

26 Claims, 5 Drawing Sheets

CAMERA WITH AUTOFOCUS AND AIMING MECHANISM AND METHOD

CROSS-REFERENCE TO RELATED APPLICATION

This application is a continuation-in-part of U.S. application Ser. No. 07/813,373 filed Dec. 23, 1991 abandoned entitled "Camera With Aiming Mechanism and Method", and a continuation-in-part of U.S. patent application Ser. No. 07/835,192 filed Feb. 12, 1992 which issued as U.S. Pat. No. 5,189,463 on Feb. 23, 1993 for "Camera Aiming Mechanism and Method" and a continuation-in-part of U.S. patent application Ser. No. 08/313,148 filed Aug. 12, 1994 which issued as U.S. Pat. No. 5,596,368 on Jan. 21, 1997 for "Camera Aiming Mechanism and Method".

TECHNICAL FIELD

This invention relates to cameras. More particularly, the invention relates to cameras that include an aiming mechanism and an autofocus system, and to methods of aiming and focusing cameras.

BACKGROUND ART

A camera is a device for taking still or moving pictures. It typically includes a body or enclosure, a lens and film. Light enters the camera through the lens and strikes the film to record an image. In a video camera, light strikes a sensor or mechanism which, in turn, records the image on magnetic tape.

Typically cameras are aimed at an object by a viewfinder. A viewfinder is a small lens attached to a camera to indicate the extent of the camera's field of view. The camera's field of view is what the camera sees or what will be included in a photograph taken by the camera. Light may enter the viewfinder itself, or it may enter a lens and be reflected to the viewfinder.

In use, a person looks through the viewfinder, positions the camera until the desired scene is shown, and then takes the picture. However, that limits the person's ability to take pictures because the camera must be held near the person's eye. Holding a camera near an eye makes it difficult for a person to take photographs around moving obstructions or of moving subjects because the camera's field of view limits the person's field of view. It is also difficult for people who wear glasses to hold and properly aim a camera near an eye because of the camera's construction.

This invention addresses those shortcomings and provides a mechanism and method to aim and properly focus a camera without having to look through the camera's viewfinder. The invention allows a photographer to hold a camera in any physical position, for example, over the photographer's head, and still properly to aim and focus the camera, and take accurate photographs.

SUMMARY OF THE INVENTION

The invention includes a camera having a field of view and a light emitting device attached to, integrated in or used in conjunction with the camera. The light emitting device projects a light beam into the camera's field of view to produce a light pattern visible on an object within the field of view. The light emitting device may be, for example, a laser, a light emitting diode, an incandescent light, a halogen light or any other high intensity light source. The light beam may be a laser beam and the light pattern may be a dot, circle or line of light. The camera often includes an autofocus system, a shutter and a shutter trigger that is connected to the light emitting device and the autofocus system. The shutter trigger, when it is contacted or depressed a certain distance, actuates the light emitting device and the autofocus system. Contacting or depressing the shutter trigger further causes the camera to take a picture. The light emitting device and autofocus system are deactivated before taking of the picture.

The autofocus system which is incorporated with the camera may take any of a number of different systems with the particular details of the autofocus system therefore being subject to variation. Describing systems that have been proposed in the past, these include systems for evaluating the contrast of focused and nonfocused images, systems for measuring the angle of one or more beams of light projected from the camera to the object, systems for analyzing the frequency components of an image as a function of focus, systems for comparing the positions or the distribution of the light patterns of auxiliary images on separate multi-element light detectors and certain mechanical systems. Systems have also been proposed which depend upon the transmission of waves such as sound waves from the camera to the object being photographed.

The invention may also include a mirror or a mechanism for reflecting the light beam in such a way that the light beam produces a line of light or outlines a predetermined region, such as a circle or rectangle framing the field of view. Alternatively, the light emitting device may itself move and direct the light beam. The light beam may also communicate information to the user relating to the position, workings or other functions or characteristics of the camera itself.

The invented method of aiming and focusing a camera includes the steps of pointing the camera toward an object, causing a light emitting device to project a light beam, directing the light beam toward an object to produce a light pattern visible on the object, and determining the camera's aim by noting the location of the light pattern on the object. The method also includes focusing the camera with the camera aimed toward the object to be photographed and before actuation of the camera's shutter mechanism.

DETAILED DESCRIPTION AND BEST MODE FOR CARRYING OUT THE INVENTION

Figure 1:
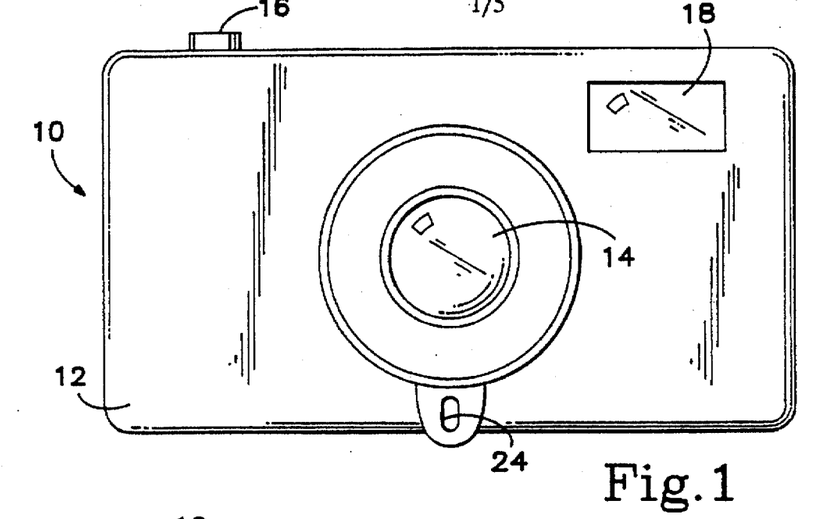
FIG. 1 is a front view of a still-photograph camera constructed according to the invention.

The preferred embodiment of the invention includes a camera, such as the 35 mm camera shown in FIG. 1 at 10. Camera 10 includes a body 12, a lens 14, a shutter trigger 16 and a viewfinder 18. The basic construction and operation of camera 10 is well known. Other types of cameras, including movie cameras and video cameras, may be used.

Figure 2:
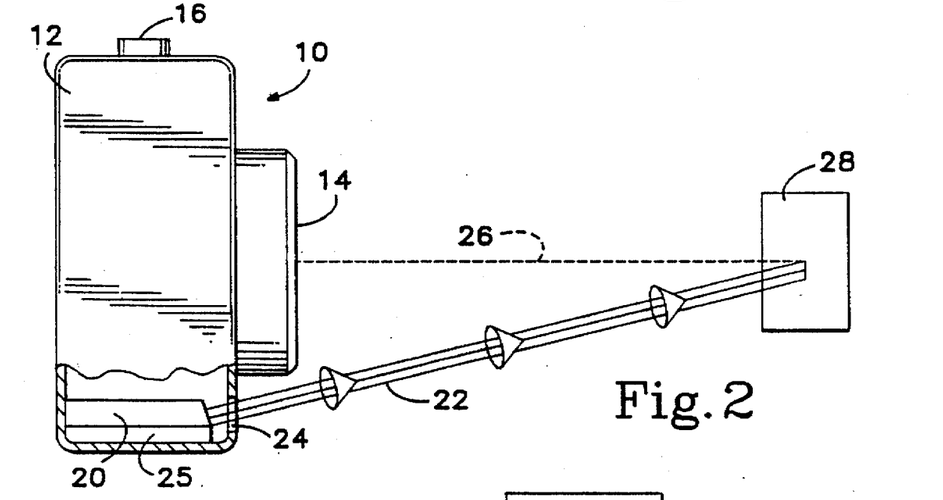
FIG. 2 is a side plan view of the camera depicted in FIG. 1 showing a focused light beam striking an object.

FIG. 2 shows a side plan view of camera 10. The bottom portion of body 12 is broken away to show a light emitting device 20 mounted within the camera. Light emitting device 20, in the preferred embodiment, is a laser. However, an incandescent light source, a light emitting diode, a halogen light or any other high intensity light source can work instead of a laser.

Light emitting device 20 projects a light beam 22 out from the camera through an aperture 24, shown in both FIGS. 1 and 2. Light beam 22, in the preferred embodiment is a focused light beam. Aperture 24 may be covered by a transparent sheet or a lens, or it may be uncovered. Light beam 22 is directed toward a predetermined point within the camera's field of view. In FIG. 2, dashed line 26 illustrates the center of the camera's field of view. Both light beam 22 and field of view line 26 strike a target 28. Target 28 is simply an object within the camera's field of view, it is not necessarily the main subject within the field of view.

Camera 10 is aimed by pointing it toward an object. The person using the camera then causes the light emitting device to project a light beam. The user directs the light beam toward the object. When the light beam strikes the object, it produces a light pattern visible on the object. The object may be the subject of the photograph, something beside the subject, or any other object in the field of view. Typically, with a light beam the light pattern will be a dot or line of light. A representative dot of light is shown at 27 in FIG. 2a. A representative line of light is shown at 29. Any other orientation of line 29 is also possible. Line 29, or other predetermined patterns, may be made by projecting a line, by moving light emitting device 20 or by using reflectors. Mechanism 25 in FIG. 2 represents any known mechanism to move light emitting device 20. Dot 27 and line 29 are shown as they would appear on object 28.

Thus, the user can determine the camera's aim by noting the location of the light pattern on the object. In this manner, the user can aim the camera from virtually any position without looking through the viewfinder. For example, a reporter could hold camera 10 above his head to take a photograph of an individual surrounded by other people. By noting the light pattern produced by the light emitting device, the reporter can know where the camera is aimed.

Figure 2A:
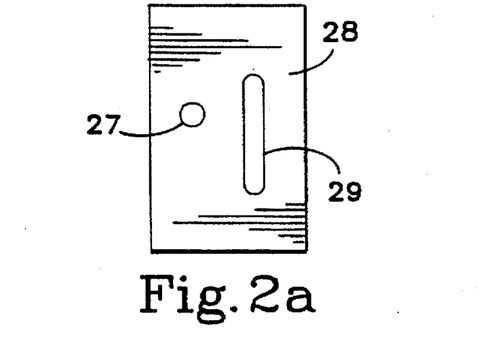
FIG. 2a is a plan view of two light patterns.

The light patterns produced by the light beams, such as those shown in FIG. 2a, may also be used to communicate information to the user. For example, the camera may sense ambient light conditions and project a predetermined light pattern telling the user that there is not enough light for the camera. Other patterns may convey other information, such as low batteries, out of film, etc. Additionally, a unique pattern may act as a "signature" for the camera to distinguish it from other similarly equipped cameras. Alternatively, other characteristics of the light beam, such as color, intensity, or size, may communicate information.

Figure 12:
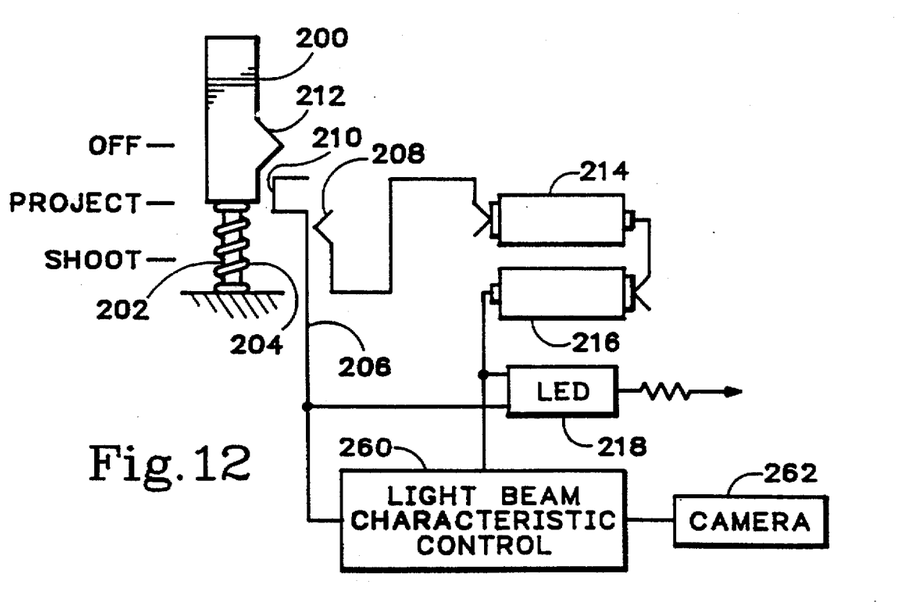
FIG. 12 shows a circuit including a light beam characteristic control.

The light beams characteristics may be controlled by a mechanism in the camera. For example, the mechanism may signal the light source to project red or green light, or to produce a predetermined light pattern. FIG. 12 is a simple circuit showing a mechanism 260 that signals a light source 218 to project a light beam with predetermined characteristics. The mechanism interprets information from camera 262 to control light source 218.

Light beam 22 in FIG. 2 is directed toward a predetermined point in the camera's field of view. If object 28 were positioned closer to or farther away from the camera, then light beam 22 may be adjusted. In most cases, however, the light beam will not need adjusting because the light beam is at such a small angle relative to the center of the camera's field of view that it strikes an object near enough to the center of the field of view to allow proper aiming. Alternatively, light beam 22 could be projected parallel to line 26, or even superimposed over line 26. Additionally, light emitting device 20 can be positioned above, beside, adjacent or in any other position near camera 10.

Figure 3:
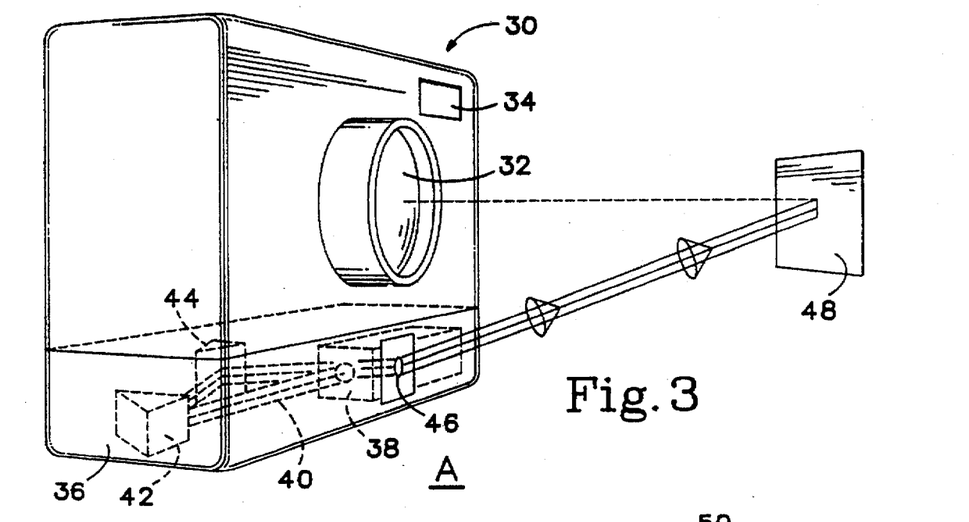
FIG. 3 is a perspective view of a second embodiment of the invention.
Figure 4:
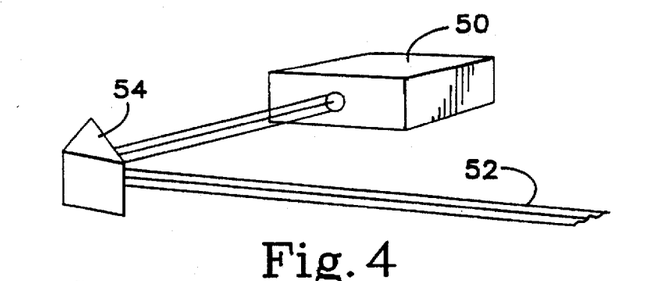
FIG. 4 is a simplified view of a light emitting device and mirror.
Figure 5:
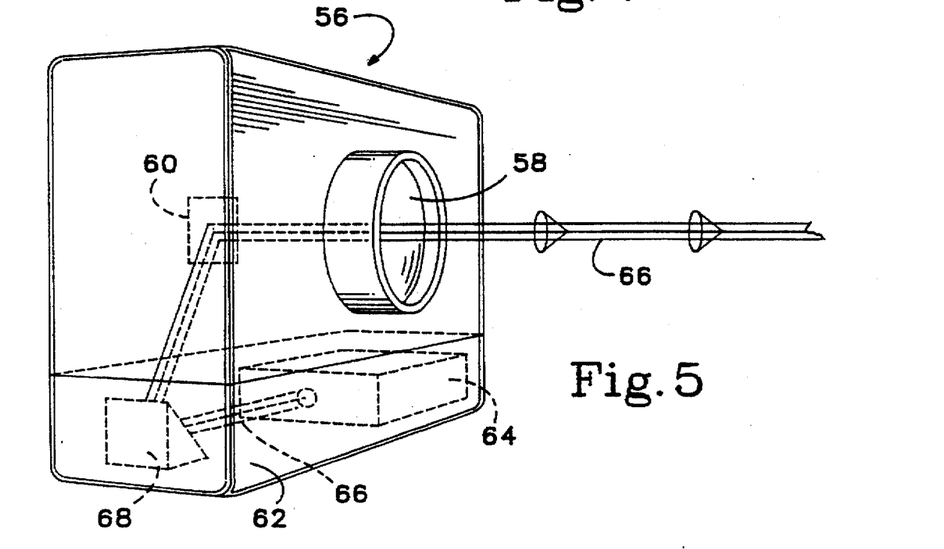
FIG. 5 is a perspective view of another embodiment of the invention.

FIGS. 3 through 5 show different embodiments of the invention. They also show different optical paths for a light beam produced by a light emitting device. The light beam shown in FIGS. 3 through 5 may be focused to produce a more distinct and visible light pattern.

FIG. 3 shows a camera 30 with a lens 32 and a viewfinder 34. An aiming mechanism 36 is attached to the bottom of camera 30. Aiming mechanism 36 may be constructed integrally with camera 30 or it may be constructed as a separate unit connectable to and removable from camera 30.

Aiming mechanism 36 includes a light emitting device 38 shown in dashed lines. Light emitting device 38 projects a light beam 40 toward a first mirror 42. Mirror 42 reflects light beam 40 toward a second mirror 44, which in turn reflects the light beam out from the aiming mechanism through an aperture 46. The light beam is then directed toward an object 48 within camera 30's field of view. Again, the invention allows a user to aim a camera and take a photograph from virtually any position, such as from position A in FIG. 3.

The construction of aiming mechanism 36 and the arrangement of mirrors allows for a compact mechanism. Alternatively, aiming mechanism 36 could include the configuration shown in FIG. 4. FIG. 4 shows a light emitting device 50 projecting a light beam 52 toward a mirror 54. Mirror 54 directs the light beam 52 out from the camera toward an object. That configuration uses only one stationary mirror.

FIG. 5 shows another embodiment of the invention including a single lens reflex camera 56. Camera 56 has a lens 58 and a mirror 60 (shown in dashed lines). Light enters the camera through lens 58 and strikes mirror 60. A portion or side of mirror 60, in turn, directs the light to a viewfinder typically located on the back of the camera (not shown in FIG. 5). Thus, a user looks through the viewfinder and sees the camera's field of view through the camera's lens. When a photograph is taken, mirror 60 is retracted so that light entering the lens can pass by it and strike the film.

Camera 56 also includes an aiming mechanism 62. The aiming mechanism includes, as in the other embodiments, a light emitting device 64 which projects a light beam 66. The light beam is reflected off mirror 68 toward mirror 60, which in turn reflects the light beam out of lens 58 into the camera's field of view. In this embodiment, the light beam is parallel with a line drawn from lens 58 to the center of the camera's field of view. Alternatively, light emitting device 64 may be positioned to project light directly out of lens 58 without any intervening mirrors.

FIGS. 1-5 all show various embodiments of the invention. Different configurations of mirrors and optical paths can be used as well.

Figure 6:
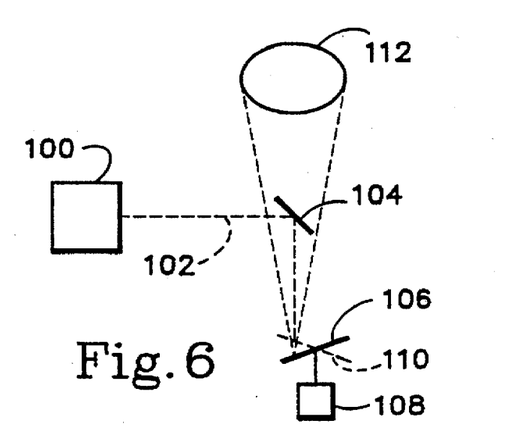
FIG. 6 is a simplified view of a mirror/motor combination.

FIG. 6 shows one arrangement of mirrors. FIG. 6 includes a light emitting device 100 which projects a light beam 102. The light beam strikes a first mirror 104 and is reflected to a second mirror 106. Mirror 106 is a planar mirror held at an angle and mounted to a motor 108. Motor 108 spins or rotates mirror 106 so that at one point during each revolution mirror 106 occupies the position shown by dashed lines at 110. Mirror 106 reflects the light beam into a camera's field of view. Because mirror 106 is held at an angle and because it spins, it reflects the light beam in different directions. Alternatively, light emitting device 100 could project light beam 102 directly at mirror 106 without mirror 104.

In FIG. 6, mirror 106 causes light beam 102 to outline a circle, as shown at 112. The circle can be used to surround or frame a subject being photographed. Alternatively, mirror 104 can rock back and forth, thereby directing light beam 102 to different positions on mirror 106. Mirror 104 may also be offset or moved so that it does not block any light reflected from mirror 106. By directing the light beam to different positions on mirror 106, the light beam can outline other patterns, such as rectangles, triangles, etc.

Figure 7:
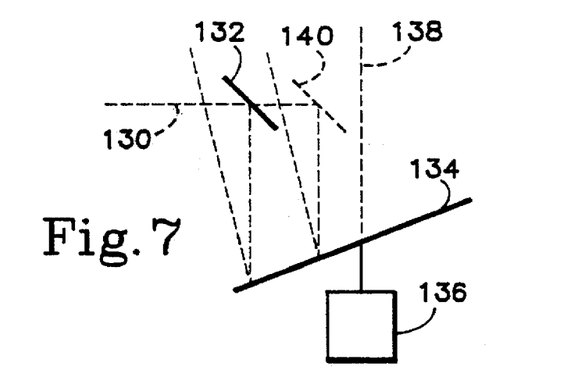
FIG. 7 is a perspective view of a camera projecting a circle of light.

FIG. 7 shows a combination of mirrors that may be used with a camera having a zoom lens. A zoom lens is a lens that, typically, moves in and out to change the magnification of the lens. By increasing the magnification, the camera can zoom in on an object to be photographed. A zoom camera is shown at 120 in FIGS. 8 and 9 with a zoom lens 122 and an arrow 124 indicating the movement of lens 122. Camera 120 will be discussed in more detail below in relation to another embodiment of the invention.

FIG. 7 shows a light beam 130 projected from a light emitting device (not shown). Light beam 130 strikes a mirror 132 which in turn reflects the light beam off a mirror 134 mounted for rotation on a motor 136. Mirror 134 is rotated around an axis 138. A second position of mirror 132 is shown at 140 in dashed lines. As is shown, position 140 is closer than mirror 132 to axis 138. The closer mirror 132 moves toward axis 138, the smaller the pattern outlined by the light beam reflected from mirror 134. Thus, by moving mirror 132 toward and away from axis 138, the size of a pattern outlined by light beam 132 can be changed. This structure is particularly applicable in a zoom camera where the camera's field of view varies depending on the magnification of the zoom lens. Mirror 132 in FIG. 7 can be operatively connected to the zoom lens in a zoom camera so that when the lens moves in and out, the mirror also moves in and out a predetermined distance, thereby adjusting the light pattern surrounding the camera's field of view. Any known control connection, both manually and electrically powered, between the zoom lens and mirror 132 can be used. Alternatively, mirror 132 can rock back and forth to direct light beam 130 toward different positions on mirror 134.

Figure 8:
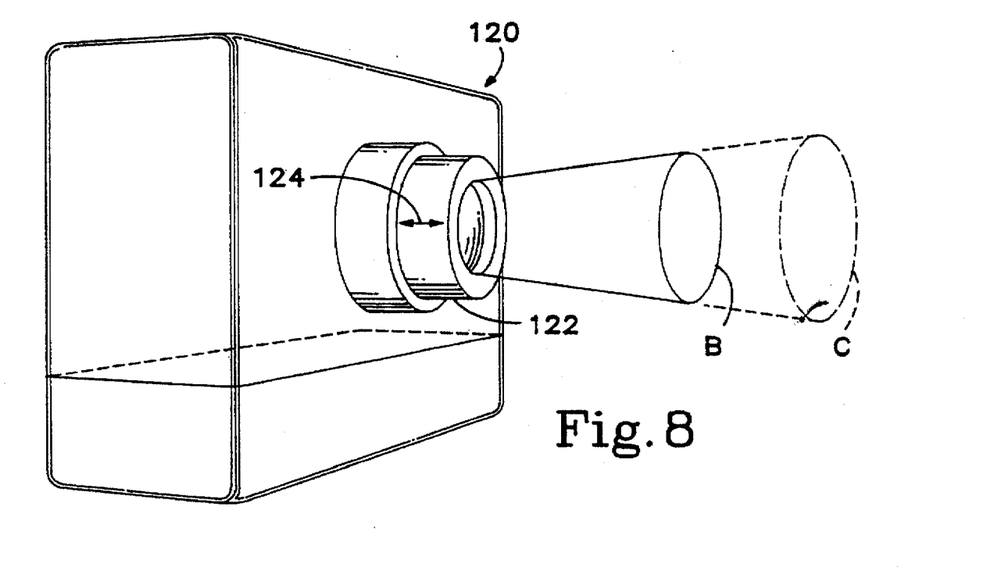
FIG. 8 is a simplified view showing different arrangements of mirrors.

FIG. 8 shows a zoom camera that includes the mirror mechanism shown in FIG. 7. The camera is shown projecting a first circle of light at B, corresponding to one zoom setting, and a second circle of light at C corresponding to a second zoom setting. As explained, the size of the circle may vary depending on the camera's zoom.

Figure 9:
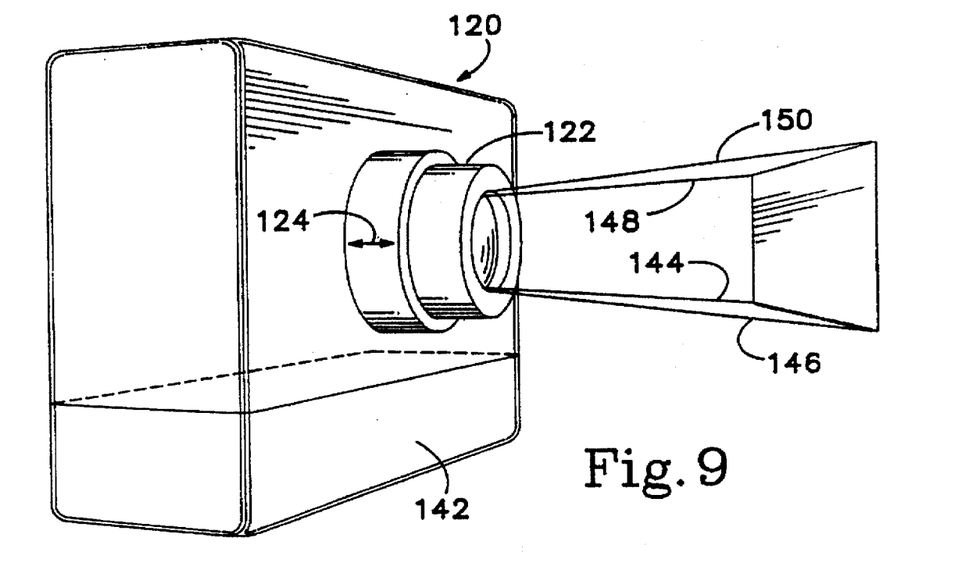
FIG. 9 is a perspective view of yet another embodiment of the invention.

FIG. 9 shows still another embodiment of the invention. As explained above, FIG. 9 includes a camera 120 with a zoom lens 122. An aiming mechanism 142 is attached to the bottom of camera 120. The embodiment shown in FIG. 9 is different from the previous embodiments because it includes an optical path which directs or splits a light beam into four separate beams, as shown at 144, 146, 148 and 150. Any known optical path for directing or splitting a light beam can be used. The four light beams are projected toward different points in the camera's field of view, thus outlining or framing an object to be photographed. Of course, other light patterns may be used.

Figure 10:
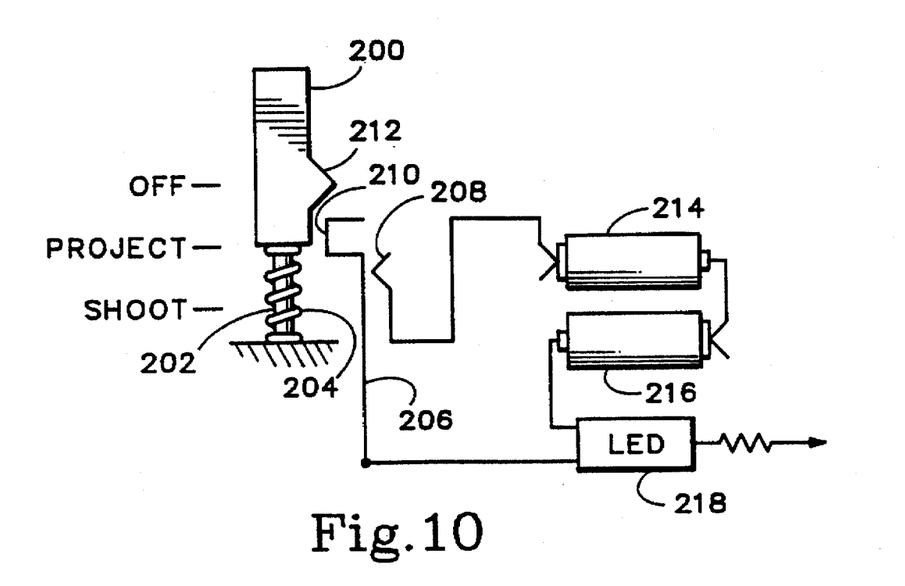
FIG. 10 is a circuit diagram showing a possible electrical connection of a light emitting device.

FIG. 10 shows a simple circuit diagram illustrating how a light emitting device can be electrically connected to a camera's shutter trigger. In FIG. 10, a shutter trigger is shown at 200. The shutter trigger is mounted to a camera (not shown). Shutter trigger 200 has three positions, an off position, a project position and a shoot position. In the off position, the light emitting device does not project a light beam, nor does the camera take a picture. In the project position, the light emitting device projects a light beam, but the camera does not take a picture. In the shoot position, the light emitting device does not project a light beam but the camera does take a picture. Shutter trigger 200 is mounted for reciprocation on a rod 202. Shutter trigger 200 is biased to the off position by a spring 204. The shutter moves to the project and shoot positions when a user presses the trigger down.

Shutter trigger 200 is positioned adjacent a spring member 206 and an electrical contact 208. Spring member 206 includes a projection 210 for contacting a second projection 212 on shutter trigger 200. Thus, when shutter trigger 200 is depressed to the project position, projection 212 pushes against projection 210 and forces spring member 206 to touch electrical contact 208.

Electrical contact 208 is connected to two 1.5-volt AA batteries, 214 and 216 respectively. The batteries themselves are connected in series and, in turn, connected to light emitting device 218. Light emitting device 218 is also connected to spring member 206, thus completing the circuit when spring member 206 touches electrical contact 208. When shutter trigger 200 is depressed to the shoot position, projection 212 slides past projection 210 and spring member 206 returns to the position shown in FIG. 10, breaking the conductive path with electrical contact 208.

A camera including the circuit shown in FIG. 10 will project a light beam when the shutter trigger is depressed to a first position, but will deactivate the light beam and take a picture when the shutter trigger is depressed to a second position. This feature allows a user to take a photograph without taking a picture of the light pattern produced by the light emitting device. In other words, when the camera takes the picture, the light pattern produced by the light beam will not be visible.

Alternatively, the light source may be activated by a separate trigger, and only deactivated by the shutter trigger. The light beam may also be activated by simply touching the trigger rather than depressing it, as is known in the art. Additionally, different photographic functions, such as focusing, can be activated when the shutter trigger is depressed to the project or first position.

There are variety of systems that have been proposed in the art for effecting an automatic focus in a camera which is focused as the result of a trigger position. These systems have included systems that evaluate contrast in focused and nonfocused images, systems that measure angles of light beams, and systems that compare the distribution of light patterns of separate images on light detector means. Prior art systems that produce focusing as a result of image analysis are specifically disclosed in U.S. Pat. No. 3,860,935, U.S. Pat. No. 3,875,401, U.S. Pat. No. 3,917,395 and U.S. Pat. No. 4,002,899. Reference is made to these issued patents for particulars of autofocus systems that may be incorporated with the present invention. As a general rule, it may be stated that the systems produce focus adjustments with characteristics sensed by the camera, and operate so that at the point of determination of best focus, a distinctive signal is applied to an output lead.

Figure 11:
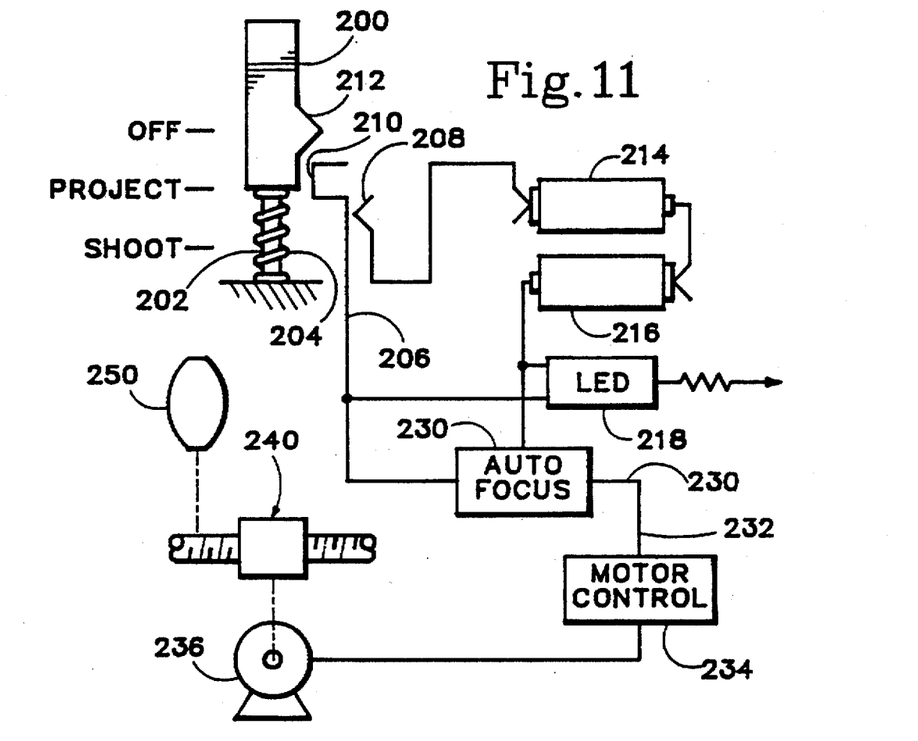
FIG. 11 illustrates a circuit which produces activation of a light emitting device and also the photographic function of focusing the camera, the light emitting and focusing functions being activated with the shutter trigger depressed partially and not fully to a position where the shutter mechanism is actuated.

Referring to FIG. 11, which shows a circuit where autofocus is part of trigger mechanism function, when shutter trigger 200 is partially depressed, its projection 212 engages projection 210 to close a circuit across autofocus system shown at 230. As described in connection with the autofocus circuit in U.S. Pat. No. 3,917,395, at the point of determination of best focus, a distinctive signal is applied to an output lead of the autofocus system, illustrated herein by the lead shown at 232.

Lead 232 connects with motor control system 234. The control system controls operation of focus motor 236. Operation of the focus motor operates a mechanical system, shown at 240, for adjusting the position of the lens system in the camera, shown schematically by the lens at 250. In operation, with a closed circuit produced for the focus system 230, the motor control system is actuated to adjust the position of lens system 250. With optimum focus obtained, a distinctive signal is applied to lead 232 which operates the motor control system so at that time to stop adjustment of the lens system.

The system described may produce adjustment of the lens system in the camera at the same time or at another time related to the time that the light emitting diode in the camera is actuated. Focusing occurs before the shutter trigger is fully depressed, and put in its shoot position, where projection 212 slides beyond projection 210. With the shutter trigger in the fully depressed shoot position, the shutter mechanism in the camera is actuated.

Included within the invention is the apparatus disclosed, which produces focusing of the camera with the camera aimed as aided by the light beam which projects from the camera. Also part of the invention is the method of aiming the camera as aided by the light beam, and focusing the camera as part of the function produced by operation of the shutter trigger.

The circuits shown in FIGS. 10 and 11 may be modified to include control of a mirror directing the light beam, or a mechanism moving the light emitting device itself. It may also be modified in any way known to include the previously discussed zoom feature.

INDUSTRIAL APPLICABILITY

This invention is applicable to the photography industry. Specifically, it is applicable to still-photograph cameras, motion picture and video cameras. Several embodiments of the invention have been disclosed but changes may be made thereto without departing from the spirit of the invention.

I claim:

1. Photographic apparatus with light beam assisted aiming capability comprising:
    a camera having a housing, a viewfinder within the housing for aiming the camera, and a lens associated with the housing for allowing light to enter the camera to record an image;
    a shutter mechanism for the camera configured to allow light to enter the camera through the lens to record an image on actuation of the shutter mechanism;
    a light source positioned within the camera's housing for projecting a beam of visible light that produces a light pattern visible to the user when the beam of light is reflected by an object, the light source being operable with the camera so that the light pattern produced by reflection of the beam of light shows where the camera is aimed without requiring a user to look through the viewfinder;
    an aperture in the camera's housing, separate from the lens, through which the light source projects the beam of visible light;
    a supply of electrical power positioned within the camera's housing to power the light source; and
    a trigger mechanism for the camera configured selectively to activate the light source, to deactivate the light source by restricting the supply of electrical power to the light source, and to actuate the shutter mechanism to allow light to enter the lens after the light source has been deactivated so that the light source does not project the beam of visible light to produce the light pattern when the shutter mechanism allows light to enter the lens to record an image.

2. The apparatus of claim 1, whereby the light source is a laser and the beam of visible light is a laser beam.

3. The apparatus of claim 1, whereby the light pattern is a dot of light.

4. The apparatus of claim 1, whereby the light pattern is a circle of light.

5. The apparatus of claim 1, wherein the camera has a field of view and wherein the light pattern frames a subject within the field of view.

6. The apparatus of claim 1, wherein the light source is a light emitting diode and the light pattern is a dot of light.

7. The apparatus of claim 1, wherein the light source is a focused incandescent light and the light pattern is a dot of light.

8. The apparatus of claim 1 where the light beam has a predetermined characteristic that communicates information relating to the camera to a user.

9. The apparatus of claim 1 where the light beam has variable predetermined characteristics that communicate information relating to the camera to a user, and further comprising a mechanism interconnecting the camera and the light source for controlling the light beam's characteristics.

10. The photographic apparatus of claim 1, wherein the trigger mechanism includes an element which is moved to a first position to activate the light source and which is moved to a second position to deactivate the light source and actuate the shutter mechanism.

11. Photographic apparatus with automatic focus and light beam assisted aiming capability comprising:
    a camera having a housing, a viewfinder within the housing for aiming the camera, and a lens associated with the housing for allowing light to enter the camera to record an image;
    a shutter mechanism for the camera configured to allow light to enter the camera through the lens to record an image on actuation of the shutter mechanism;
    a light emitting device positioned within the camera's housing for projecting a beam of light that produces a light pattern visible to the user when the beam of light is reflected by an object, the light emitting device being operable with the camera so that the light pattern produced by reflection of the beam of light shows where the camera is aimed without requiring a user to look through the viewfinder;

an aperture in the camera's housing, separate from the lens, through which the light emitting device projects the beam of visible light;

a supply of electrical power positioned within the camera's housing to power the light emitting device; and an autofocus system for the camera for adjusting the focus of the lens; and a trigger mechanism for the camera configured selectively to activate the light emitting device, to deactivate the light emitting device by restricting the supply of electrical power to the light emitting device, to activate the autofocus system, and to actuate the shutter mechanism to allow light to enter the lens after the light emitting device has been deactivated so that the light emitting device does not project the beam of visible light to produce the light pattern when the shutter mechanism allows light to enter the lens to record an image and so that the autofocus system focuses the camera prior to recording an image.

12. The apparatus of claim 11, whereby the light emitting device is a laser and the light beam is a laser beam.

13. The apparatus of claim 11, wherein the camera has a field of view and wherein the light pattern frames a subject within the field of view.

14. The apparatus of claim 11, wherein the light emitting device is a light emitting diode and the light pattern is a dot of light.

15. The apparatus of claim 11, wherein the light emitting device is a focused incandescent light and the light pattern is a dot of light.

16. The apparatus of claim 11 where the light beam has a predetermined characteristic that communicates information relating to the camera to a user.

17. The apparatus of claim 11 where the light beam has variable predetermined characteristics that communicate information relating to the camera to a user, and further comprising a mechanism interconnecting the camera and the light source for controlling the light beam's characteristics.

18. The apparatus of claim 11, wherein the trigger mechanism includes an element which is moved to a first position to activate the light emitting device and the autofocus system and which is moved to a second position to deactivate the light emitting device and actuate the shutter mechanism.

19. A method of operating a camera to record an image therewith where the camera has a housing having an aperture, a light source within the housing, a shutter mechanism and a shutter trigger, the method comprising:

producing a beam of visible light from the light source, where the visible light beam produced indicates the direction that the camera is aimed;

directing the light beam through the aperture in the camera's housing and toward the image to be recorded, with the light beam producing a visible reflected light pattern on an object associated with the image;

adjusting the camera as determined by the reflected light pattern to obtain proper aiming of the camera; and actuating the shutter trigger to first stop the production of the light beam and then to actuate the shutter mechanism.

20. A method of operating a camera to record an image therewith where the camera has a housing having an aperture and a light source within the housing, the method comprising:

producing a light beam from the light source which indicates the direction that the camera is aimed;

directing the light beam through the aperture in the camera's housing and toward the image to be recorded, with the light beam producing a visible reflected light pattern on an object associated with the image;

adjusting the camera as determined by the reflected light pattern to obtain proper aiming of the camera;

focusing the camera with an automatic focusing system that produces focus adjustments with characteristics sensed by the camera as aimed; and after focusing the camera, and with the production of the light beam stopped, actuating the camera to produce recording of the image.

21. A method of operating a camera to record an image therewith where the camera has a housing having an aperture, a light source within the housing, and a shutter mechanism and a shutter trigger operable to actuate at least two functions, the method comprising:

producing a light beam from the light source indicating the direction that the camera is aimed;

directing the light beam through the aperture within the camera's housing and toward the image to be recorded, with the light beam producing a visible reflected light pattern on an object associated with the image;

adjusting the camera as determined by the reflected light pattern to obtain proper aiming of the camera;

performing focusing of the camera with focusing mechanism actuated by the shutter trigger; and after focusing of the camera, further actuating the shutter trigger to stop the production of the light beam and to actuate the shutter mechanism.

22. A photographic apparatus with aiming capability, the apparatus comprising:

a camera having a field of view and a housing;

a light emitting device positioned within the camera's housing and used in conjunction with the camera for projecting a light beam to identify at least a part of the field of view by producing a light pattern visible on an object having a known position relative to the field of view;

an aperture in the camera's housing, separate from the lens, through which the light emitting device projects the light beam;

a moveable mirror adjacent the light emitting device for reflecting the light beam;

a mechanism for moving the mirror so that the light pattern produced by the light beam outlines a predetermined region; and a moveable zoom lens;

where the mechanism moves the mirror in a predetermined manner depending on the movement of the zoom lens.

23. A photograph apparatus capable of being aimed by a user without the user having to look through a viewfinder, the apparatus comprising:

a camera having a field of view and a housing;

a shutter mechanism within the camera that allows light to enter the camera to record an image;

a trigger on the camera to actuate the shutter mechanism;

a light emitting device positioned within the camera's housing for projecting a light beam which produces a light pattern visible to the user when reflected by an object;

an aperture in the camera's housing, separate from the lens, through which the light emitting device projects the light beam;

a moveable mirror adjacent the light emitting device for reflecting the light beam into the camera's field of view; and a mechanism for moving the mirror so that the light pattern produced by the light beam outlines a predetermined region;

where the light emitting device is attached to the camera within the camera's housing so that the light pattern produced by the reflection of the light beam shows where the camera is aimed; and where the trigger deactivates the light emitting device when it actuates the shutter mechanism.

24. The apparatus of claim 23, where the mirror, as it moves, reflects the light beam in such a way that the light beam outlines a circle.

25. The apparatus of claim 23, where the mirror, as it moves, reflects the light beam in such a way that the light beam outlines a rectangle.

26. A photographic apparatus with aiming capability, the apparatus comprising:

a camera having a field of view and a housing;

a light emitting device positioned within the camera's housing used in conjunction with the camera for projecting a light beam to identify at least a part of the field of view by producing a light pattern visible to a person adjacent the camera on an object having a known position relative to the field of view;

an aperture in the camera's housing, separate from the lens, through which the light emitting device projects the light beam;

a moveable zoom lens; and a mechanism for controlling the light pattern depending on the zoom so that the light pattern indicates the zoom to the person adjacent the camera.

* * * * *